(12) United States Patent
Asanuma

(10) Patent No.: US 7,134,274 B2
(45) Date of Patent: Nov. 14, 2006

(54) EXHAUST GAS CONTROL APPARATUS FOR INTERNAL COMBUSTION ENGINE

(75) Inventor: Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/562,900

(22) PCT Filed: Jun. 9, 2005

(86) PCT No.: PCT/IB2005/001612

§ 371 (c)(1),
(2), (4) Date: Dec. 29, 2005

(87) PCT Pub. No.: WO2005/121516

PCT Pub. Date: Dec. 22, 2005

(65) Prior Publication Data

US 2006/0230749 A1  Oct. 19, 2006

(30) Foreign Application Priority Data

Jun. 10, 2004  (JP) .............................. 2004-173065

(51) Int. Cl.
*F01N 3/00* (2006.01)

(52) U.S. Cl. ............................ 60/295; 60/274; 60/276; 60/286; 60/297

(58) Field of Classification Search ................ 60/274, 60/276, 278, 280, 285, 286, 295, 297, 301
See application file for complete search history.

(56) References Cited

U.S. PATENT DOCUMENTS

| 6,145,303 | A  | * | 11/2000 | Strehlau et al. ............... 60/274 |
| 6,348,177 | B1 | * | 2/2002  | Bartley et al. ............... 422/177 |
| 6,843,052 | B1 | * | 1/2005  | Hertzberg et al. ............. 60/274 |
| 6,922,988 | B1 | * | 8/2005  | Yamaguchi et al. ........... 60/286 |
| 2001/0039798 | A1 | | 11/2001 | Pott |

FOREIGN PATENT DOCUMENTS

| DE | 100 23 791 A1 | 12/2001 | |
| JP | A 2000-045753 | 2/2000 | |
| JP | A 2000-230419 | 8/2000 | |
| JP | A 2000-274232 | 10/2000 | |
| JP | A 2001-003782 | 1/2001 | |
| JP | A 2001-082137 | 3/2001 | |
| JP | 2002309929 A * | 4/2001 | .................. 60/295 |
| JP | A 2001-303937 | 10/2001 | |
| JP | A 2003-35132 | 2/2003 | |

* cited by examiner

Primary Examiner—Binh Q. Tran
(74) Attorney, Agent, or Firm—Oliff & Berridge, PLC

(57) ABSTRACT

There are provided a NOx storage reduction catalyst which is provided in an exhaust passage for an internal combustion engine, and concentration detection means whose detection state can be changed between a first detection state in which a total concentration of sulfur oxide and hydrogen sulfide in exhaust gas that has passed through the NOx catalyst is detected, and a second detection state in which a concentration of the sulfur oxide in the exhaust gas is detected. An operating state of the internal combustion engine is controlled such that the sulfur oxide is released from the NOx catalyst (sulfur poisoning recovery process). The detection state of the concentration detection means is alternately changed between the first detection state and the second detection state after the concentration detection means which is caused to remain in the second detection state detects release of the sulfur oxide from the NOx catalyst during the sulfur poisoning recovery process, whereby the concentration of the sulfur oxide and a concentration of the hydrogen sulfide are obtained.

10 Claims, 8 Drawing Sheets

EXHAUST GAS CONTROL APPARATUS FOR INTERNAL COMBUSTION ENGINE

BACKGROUND OF THE INVENTION

1. Field of the Invention

The invention relates to an exhaust gas control apparatus for an internal combustion engine, which has a function for recovering a NOx storage reduction catalyst from poisoning caused by a sulfur component.

2. Description of the Related Art

A NOx storage reduction catalyst (hereinafter, the NOx storage reduction catalyst may be referred to as "NOx catalyst") is provided in an exhaust passage. The NOx catalyst may be poisoned with sulfur oxide (SOx) (i.e., sulfur poisoning may occur). In this case, it is necessary to recover the NOx catalyst from sulfur poisoning so that a catalyst control function is restored. Therefore, a sulfur poisoning recovery process is performed at given time intervals. In the sulfur poisoning recovery process, a temperature of the NOx catalyst is increased to a temperature range in which SOx is released (hereinafter, referred to as "SOx release temperature range"), and the NOx catalyst is brought into a reducing atmosphere. For example, Japanese Patent Application Publication No. JP (A) 2000-045753 discloses an exhaust gas control apparatus in which an accumulated amount of SOx in a NOx catalyst is calculated based on a concentration of SOx that is detected by a SOx sensor provided at a portion downstream of the NOx catalyst; and when the accumulated amount exceeds a predetermined limit, a temperature of the NOx catalyst is increased to a SOx release temperature range (i.e., the temperature range of approximately 600° C. or higher), and an air-fuel ratio of exhaust gas (hereinafter, referred to as "exhaust gas air-fuel ratio") is made rich for a predetermined time period so that the NOx catalyst is recovered from sulfur poisoning.

Also, in the sulfur poisoning recovery process, SOx released from the NOx catalyst reacts with hydrocarbon (HC) and carbon monoxide (CO), and thus hydrogen sulfide ($H_2S$) is generated. Since $H_2S$ causes sulfur odor, an amount of released $H_2S$ needs to be reduced. Accordingly, Japanese Patent Application Publication No. JP (A) 2003-035132 discloses an exhaust gas control apparatus in which a sensor for detecting a concentration of $H_2S$ is disposed at a portion downstream of the NOx storage reduction catalyst, and the sulfur poisoning recovery process is controlled based on an output value of the sensor.

However, in the exhaust gas control apparatus using the SOx sensor disclosed in the Japanese Patent Application Publication No. JP (A) 2000-045753, since the amount of released SOx is not detected during the sulfur poisoning recovery process, the sulfur poisoning recovery process may be continued even when almost no SOx is released from the NOx catalyst, or the sulfur poisoning recovery process may be excessively performed and the amount of released $H_2S$ may not be reduced. In the exhaust gas control apparatus using the $H_2S$ sensor disclosed in the Japanese Patent Application Publication No. JP (A) 2003-035132, though generation of $H_2S$ is suppressed, the actual amount of released SOx cannot be detected during the sulfur poisoning recover process, as in the exhaust gas control apparatus disclosed in the Japanese Patent Application Publication No. JP (A) 2000-045753. Therefore, the sulfur poisoning recovery process may be continued while SOx is not sufficiently released. That is, a condition on which SOx is released from the NOx catalyst does not necessarily match a condition on which $H_2S$ is generated. Accordingly, when the sulfur poisoning recovery process is performed based on only the concentration of $H_2S$, the sulfur poisoning recovery process may not appropriately proceed.

SUMMARY OF THE INVENTION

Accordingly, it is an object of the invention to provide an exhaust gas control apparatus for an internal combustion engine, in which release of hydrogen sulfide ($H_2S$) is accurately detected during a sulfur poisoning recovery process, the release of the hydrogen sulfide ($H_2S$) is reliably suppressed, and sulfur oxide (SOx) is reliably released.

A first aspect of the invention relates to an exhaust gas control apparatus for an internal combustion engine, which includes a NOx storage reduction catalyst which is provided in an exhaust passage for an internal combustion engine; concentration detection means whose detection state can be changed between a first detection state in which a total concentration of sulfur oxide and hydrogen sulfide in exhaust gas that has passed through the NOx storage reduction catalyst is detected, and a second detection state in which a concentration of the sulfur oxide in the exhaust gas is detected; and a controller which can perform a sulfur poisoning recovery process that controls an operating state of the internal combustion engine such that the sulfur oxide is released from the NOx storage reduction catalyst. The detection state of the concentration detection means is alternately changed between the first detection state and the second detection state after the concentration detection means which is in the second detection state detects release of the sulfur oxide from the NOx storage reduction catalyst during the sulfur poisoning recovery process performed by the controller, whereby the concentration detection means obtains the concentration of the sulfur oxide and a concentration of the hydrogen sulfide.

When the sulfur poisoning recovery process for the NOx catalyst is performed, the sulfur oxide starts to be released earlier than the hydrogen sulfide. In the first aspect of the invention, the detection state of the concentration detection means is alternately changed between the first detection state and the second detection state after the concentration detection means which is in the second detection state detects the release of the sulfur oxide from the NOx storage reduction catalyst. Therefore, it is possible to reliably suppress the release of the hydrogen sulfide during the sulfur poisoning recovery process.

In the first aspect of the invention, the detection state of the concentration detection means may be changed between the first detection state and the second detection state at given time intervals. Thus, by changing the detection state of the concentration detection means between the first detection state and the second detection state at given time intervals, it is possible to accurately detect the total concentration and the concentration of the sulfur oxide. Accordingly, it is possible to accurately obtain the concentration of the hydrogen sulfide.

In the first aspect of the invention, the detection state of the concentration detection means may be changed to the first detection state when it is determined that a range of variation of the concentration of the sulfur oxide that is detected by the concentration detection means is equal to or less than a predetermined value. In this case, when the range of variation of the concentration of the sulfur oxide is greater than the predetermined value, the detection state of the concentration detection means is prohibited from being changed to the first detection state. Therefore, it is possible to improve accuracy of detecting the concentration of the sulfur oxide. Accordingly, it is possible to stably and accurately obtain the concentration of the hydrogen sulfide based on the total concentration and the concentration of the sulfur oxide.

In the first aspect of the invention, the concentration detection means may include an oxidation catalyst that has oxidation catalytic activity for the hydrogen sulfide; the concentration detection means which is in the first detection state may detect the total concentration of the sulfur oxide and the hydrogen sulfide in exhaust gas that has passed through the oxidation catalyst; and a delay period from when the detection state of the concentration detection means is changed to the first detection state until when the total concentration is detected may be set to be longer than a delay period from when the detection state of the concentration detection means is changed to the second detection state until when the concentration of the sulfur oxide is detected. Response of the concentration detection means when the detection state of the concentration detection means is changed from the second detection state to the first detection state is delayed by a period during which the exhaust gas passes through the oxidation catalyst, as compared to the response of the concentration detection means when the detection state of the concentration detection means is changed from the first detection state to the second detection state. Therefore, by setting each of the delay periods according to the response when the detection state of the concentration detection means is changed to each of the first detection state and the second detection state, it is possible to accurately obtain the concentration of the hydrogen sulfide.

Further, in the first aspect of the invention, when the controller determines that the concentration of the hydrogen sulfide that is obtained by the concentration detection means during the sulfur poisoning recovery process exceeds a permissible limit, the controller may cause the concentration detection means to remain in the first detection state, the controller may control the operating state of the internal combustion engine such that the sulfur oxide is released from the NOx storage reduction catalyst, an amount of the released sulfur oxide is in a predetermined range, and the concentration of the hydrogen sulfide is reduced, and the controller may change the detection state of the concentration detection means to the second detection state after the total concentration starts to decrease. By controlling the operating state of the internal combustion engine in this manner, it is possible to accurately and reliably suppress release of the hydrogen sulfide during the sulfur poisoning recovery process.

The controller may control the operating state of the internal combustion engine such that the concentration of the hydrogen sulfide is reduced, by performing at least one of a process of increasing an exhaust gas air-fuel ratio in a rich air-fuel ratio range, and a process of decreasing a temperature of the NOx storage reduction catalyst in a temperature range in which the sulfur oxide is released. By controlling the operating state in this manner, it is possible to suppress generation of the hydrogen sulfide caused by the sulfur oxide released from the NOx storage reduction catalyst.

When the controller determines that the concentration of the hydrogen sulfide is lower than a permissible limit, the controller may control the operating state of the internal combustion engine such that the amount of the sulfur oxide released from the NOx storage reduction catalyst is increased. By controlling the operating state in this manner, the sulfur poisoning recovery process can be caused to proceed efficiently by promoting release of the sulfur oxide as much as possible while the concentration of the hydrogen sulfide does not exceed the permissible limit.

The controller may control the operating state of the internal combustion engine such that the amount of the released sulfur oxide is increased, by performing at least one of a process of decreasing an exhaust gas air-fuel ratio, and a process of increasing a temperature of the NOx storage reduction catalyst. By controlling the operating state in this manner, it is possible to increase the amount of the sulfur oxide released from the NOx reduction storage catalyst.

As has been described so far, the exhaust gas control apparatus according to each of the aforementioned aspects of the invention includes concentration detection means whose detection state is changed, and which detects the concentration of the sulfur oxide at a portion downstream of the NOx storage reduction catalyst and the total concentration of the sulfur oxide and the hydrogen sulfide at the portion downstream of the NOx storage reduction catalyst. When the sulfur poisoning recovery process for the NOx storage reduction catalyst is performed, first, the concentration of the sulfur oxide is detected, and then the total concentration and the concentration of the sulfur oxide are alternately detected after release of the sulfur oxide from the NOx storage reduction catalyst is detected. Therefore, it is possible to accurately obtain the concentration of the hydrogen sulfide. Accordingly, it is possible to reliably suppress generation of the hydrogen sulfide. Also, since the operating state of the internal combustion engine is controlled such that the sulfur oxide is released while the concentration of the hydrogen sulfide is reduced to be equal to or lower than the permissible limit, based on the concentration of the hydrogen sulfide and the concentration of the sulfur oxide. Thus, recovery of the NOx catalyst function can be caused to proceed reliably by releasing the sulfur oxide while suppressing occurrence of sulfur odor caused by the hydrogen sulfide.

BRIEF DESCRIPTION OF THE DRAWINGS

The foregoing and/or further objects, features and advantages of the invention will become more apparent from the following description of exemplary embodiment with reference to the accompanying drawings, in which like numerals are used to represent like elements and wherein.

DETAILED DESCRIPTION OF THE EXEMPLARY EMBODIMENTS

Figure 1:
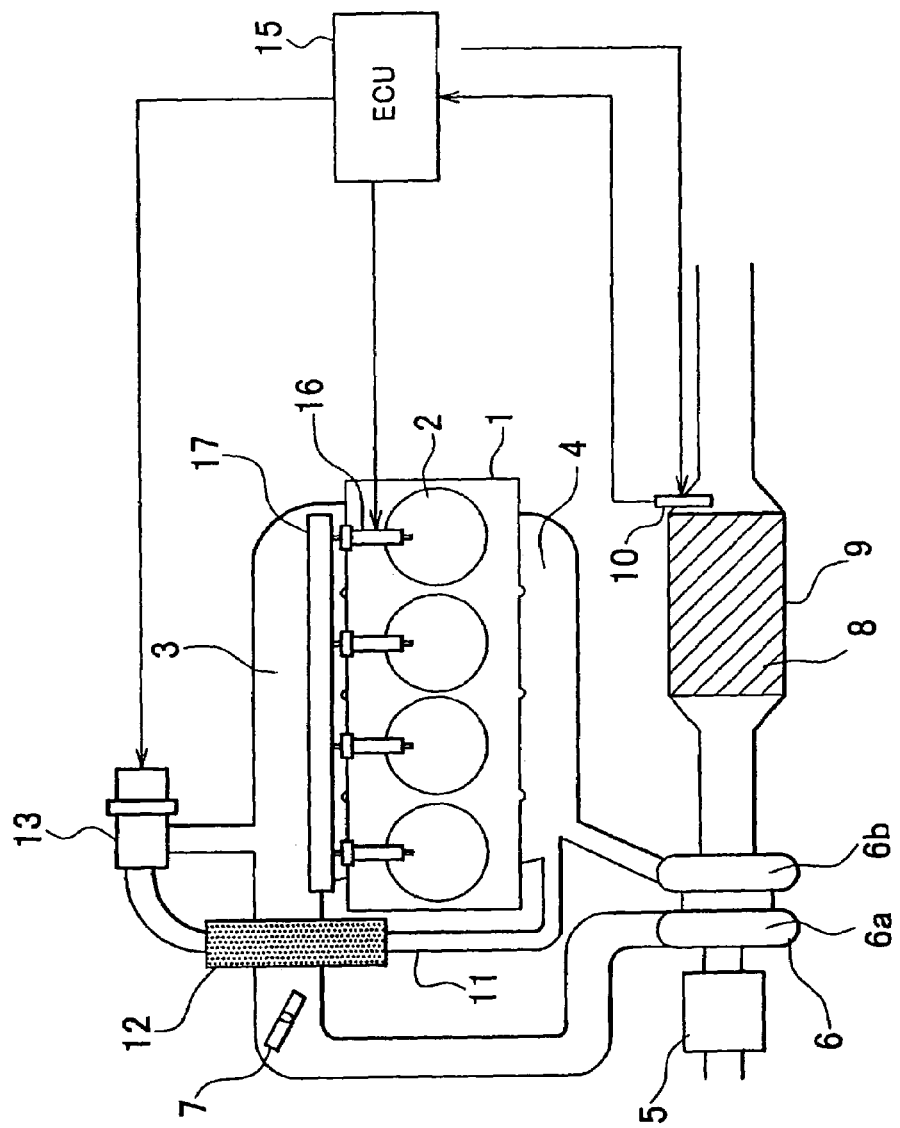
FIG. 1 is a diagram showing a configuration of an internal combustion engine to which the invention is applied.

FIG. 1 shows a diesel engine 1 as an internal combustion engine, and an intake and exhaust systems therefor. The engine 1 is installed in a vehicle as a power source for running. An intake passage 3 and an exhaust passage 4 are connected to cylinders 2 of the engine 1. An air filter 5 for filtering intake air, a compressor 6a of a turbo charger 6, and a throttle valve 7 for adjusting an amount of intake air are provided in the intake passage 3. A turbine 6b of the turbo charger 6 is provided in the exhaust passage 4. An exhaust gas control unit 9 including a NOx storage reduction catalyst (hereinafter, referred to as "catalyst") 8 is provided at a portion downstream of the turbine 6b in the exhaust passage 4. A sulfur concentration sensor 10 serving as concentration detection means for detecting a concentration of a sulfur component in exhaust gas is provided at a portion downstream of the catalyst 8. The exhaust gas control unit 9 may have a structure in which NOx catalytic material is supported by a diesel particulate filter for capturing particulate matter in exhaust gas. Also, the exhaust gas control unit 9 may be provided separately from such a filter. The NOx storage reduction catalyst is a catalyst which can retain NOx. It is to be understood that the term "storage" used herein means retention of NOx in the form of at least one of adsorption, adhesion, absorption, trapping, occlusion, and others. Also, sulfur poisoning may occur in any manner. Further, NOx and SOx may be released in any manner. The exhaust passage 4 is connected to the intake passage 3 through an EGR passage 11. An EGR cooler 12 and an EGR valve 13 are provided in the EGR passage 11.

An air-fuel ratio at a portion where the NOx catalyst 8 is fitted (hereinafter, the air-fuel ratio may be referred to as "exhaust gas air-fuel ratio"), and a temperature of the NOx catalyst 8 are controlled by an engine control unit (ECU) 15. The ECU 15 is a known computer unit which controls an operating state of the engine 1 by operating various devices such as the fuel injection valve 16 which injects fuel to the cylinder 2, a pressure adjustment valve for a common rail 17 which accumulates pressure of fuel supplied to the fuel injection valve 16, the throttle valve 7 for adjusting the amount of intake air, and the EGR valve 13. The ECU 15 controls fuel injection operation of the fuel injection valve 16 so that an air-fuel ratio, which is a ratio between mass of air taken in the cylinder 2 and mass of fuel supplied from the fuel injection valve 16, is controlled to a predetermined target air-fuel ratio. During normal operation, the target air-fuel ratio is controlled to be a lean air-fuel ratio at which an air amount is larger than an air amount at a stoichiometric air fuel ratio. However, when NOx and SOx are released from the NOx catalyst 8, the exhaust gas air-fuel ratio is controlled to the stoichiometric air-fuel ratio, or a rich air-fuel ratio at which a fuel amount is larger than a fuel amount at the stoichiometric air fuel ratio. Also, since the ECU 15 performs routines shown in FIG. 6 to FIG. 9 described later, the ECU 15 functions as poisoning recovery control means according to an exemplary embodiment of the invention. The ECU 15 controls other various devices, which are not shown in FIG. 1. Also, in order to perform the aforementioned various controls, the engine 1 is provided with various sensors such as an exhaust gas temperature sensor and an air-fuel ratio sensor, which are not shown in FIG. 1.

Figure 2:
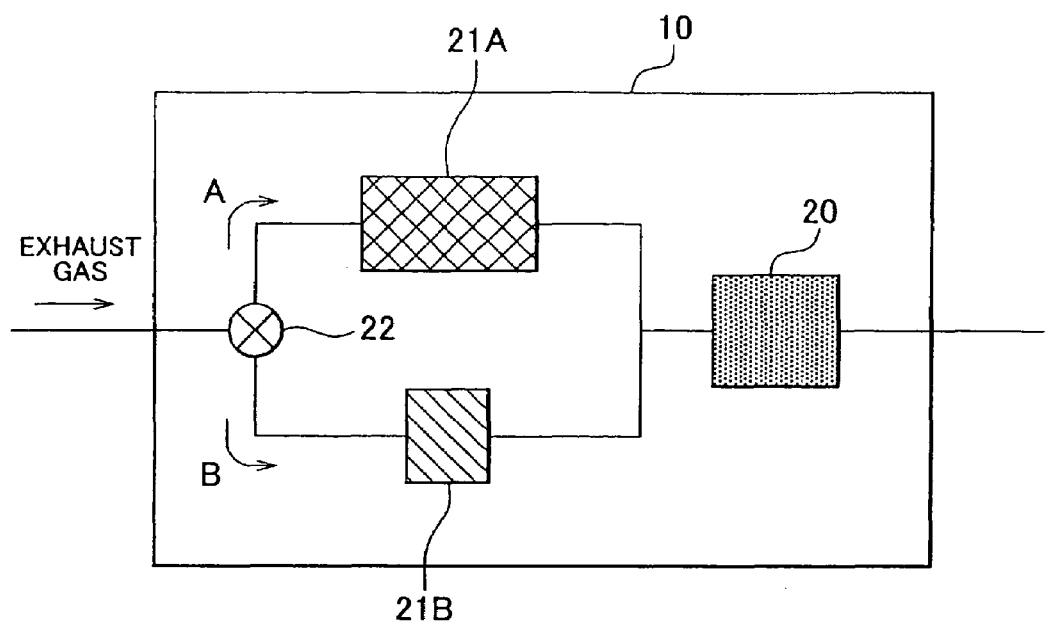
FIG. 2 is a diagram showing an outline of a configuration of a sulfur concentration sensor used in an exhaust gas control apparatus shown in FIG. 1.

Next, an example of the sulfur concentration sensor 10 will be described with reference to FIG. 2 and FIG. 3. As shown in FIG. 2, the sulfur concentration sensor 10 includes a SOx concentration detection portion 20 which detects a concentration of SOx in exhaust gas, an oxidation catalyst 21A which has oxidation catalytic activity for $H_2S$ in exhaust gas and has high oxidizing ability, an oxidation catalyst 21B which has lower oxidizing ability than that of the oxidation catalyst 21A, and a change-over valve 22 which can change a direction of a flow of exhaust gas in the sulfur concentration sensor 10 between a direction shown by an arrow A in FIG. 2 and a direction shown by an arrow B in FIG. 2. The oxidation catalyst 21B has the oxidizing ability which can oxidize most part of sulfur oxide (SOx; however, most part of the sulfur oxide is sulfur dioxide ($SO_2$)) to sulfur trioxide ($SO_3$). Since the oxidizing ability of the oxidation catalyst 21B is low, most part of $H_2S$ passes through the oxidation catalyst 21B without being oxidized. The oxidizing ability of the oxidation catalyst 21A and the oxidizing ability of the oxidation catalyst 21B can be made different from each other, for example, by making density of platinum used as the catalytic material in the catalyst 21A different from that in the catalyst 21B, making capacity of the catalyst 21A different from that of the catalyst 21B, or making the catalytic material in the catalyst 21A different from that in the catalyst 21B. That is, the density of Pt in the catalyst 21A having high oxidizing ability may be set to be high (i.e., an amount of supported Pt in the catalyst 21A may be set to be large), and the density of Pt in the catalyst 21B having low oxidizing ability may be set to be low (the amount of supported Pt in the catalyst 21B may be set to be small). The capacity of the catalyst 21A may be set to be large, and the capacity of the catalyst 21B may be set to be small while the density of Pt in the catalyst 21A and the density of Pt in the catalyst 21B are set to be equal to each other. Also, catalytic material having high oxidizing ability (for example, Pt) may be used in the catalyst 21A, and catalytic material having low oxidizing ability (for example, palladium (Pd)) may be used in the catalyst 21B. The oxidizing ability of the catalyst. 21A and the oxidizing ability of the catalyst 21B may be made different from each other also by controlling a temperature of the catalyst 21B having low oxidizing ability to a value lower than a temperature of the catalyst 21A having high oxidizing ability. Further, the oxidizing ability of the catalyst 21A and the oxidizing ability of the catalyst 21B may be made different from each other by appropriately combining these methods.

Figure 3:
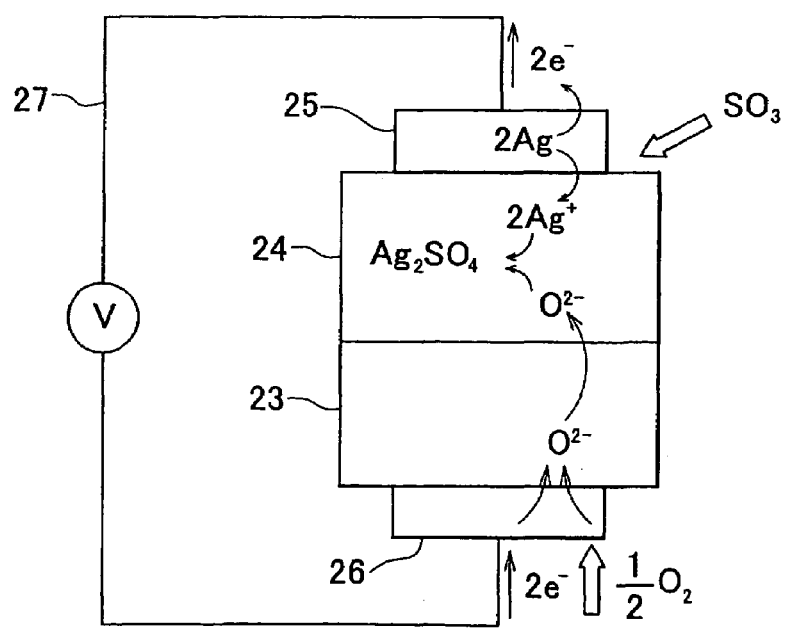
FIG. 3 shows a principle of detection in the sulfur concentration sensor in FIG. 2.

FIG. 3 shows a principle of detection in the SOx concentration detection portion 20. As shown in FIG. 3, in the SOx concentration detection portion 20, a sub-electrode 24 and a detection electrode 25 are provided on one surface of an oxygen ion conductor 23, and a reference electrode 26 is provided on the other surface of the oxygen ion conductor 23. For example, the oxygen ion conductor 23 is made using yttria stabilized zirconia, the sub-electrode 24 is made using sulfate, the detection electrode 25 is made using silver (Ag), and the reference electrode 26 is made using platinum (Pt). As the sulfate used for making the sub-electrode 24, mixed salt of silver sulfate ($Ag_2SO_4$) and barium sulfate ($BaSO_4$) is preferably employed. The silver sulfate is responsible for a responsive reaction in the sub-electrode 24. In order to stabilize the silver sulfate, the barium sulfate is added. Also, metallic silver is responsible for a responsive reaction in the detection electrode 25. In order to improve strength of the electrode, silver-plated platinum is preferably used.

The principle of detection in the SOx concentration detection portion 20 is as follows. First, $SO_3$ guided to the SOx concentration detection portion 20 reacts with the metallic silver of the detection electrode 25, and electrons are released from the metallic silver. Then, remaining silver ions ($Ag^+$) move to the sub-electrode 24. The electrons released from the detection electrode 25 are guided to the reference electrode 26 through an external circuit 27. At the reference electrode 26, the electrons is combined with oxygen ($O_2$), and oxygen ions ($O^{2-}$) are generated. The oxygen ions pass through the oxygen ion conductor 23 to reach the sub-electrode 24. In the sub-electrode 24, the silver ions and the oxygen ions react with $SO_3$, and thus silver sulfide is generated. Due to the reactions that have been described, electromotive force is generated between the detection electrode 25 and the reference electrode 26 according to the concentration of SOx, on the condition that partial pressure of oxygen is constant. By measuring the electromotive force, the concentration of SOx can be detected.

Operation of the change-over valve 22 is controlled by the ECU 15. The sulfur concentration sensor 10 can detect a total concentration of SOx and $H_2S$ in exhaust gas by guiding the exhaust gas in the direction shown by the arrow A in FIG. 2 using the change-over valve 22. Also, the sulfur concentration sensor 10 can detect the concentration of SOx in the exhaust gas by guiding the exhaust gas in the direction shown by the arrow B in FIG. 2 using the change-over valve 22. When the exhaust gas is guided in the direction shown by the arrow A in FIG. 2, $SO_2$ and $H_2S$ in the exhaust gas is changed to $SO_3$ by the oxidation catalyst 21A. The generated $SO_3$ and $SO_3$ present in the exhaust gas are guided to the SOx concentration detection portion 20. Therefore, electromotive force corresponding to the total concentration which is a total of the concentration of SOx and the concentration of $H_2S$ is generated between the electrodes 25 and 26. Meanwhile, when the exhaust gas is guided in the direction shown by the arrow B in FIG. 2, most part of $H_2S$ is guided to the SOx concentration detection portion 20 without being oxidized. Therefore, electromotive force corresponding to the concentration of SOx in the exhaust gas is generated. By changing the direction of the flow of exhaust gas in this manner using the change-over valve 22, it is possible change detection of the concentration between detection of the total concentration and detection of SOx. Hereinafter, a state in which the exhaust gas is guided to the SOx concentration detection portion 20 through the oxidation catalyst 21A (i.e., a state in which the exhaust gas is guided in the direction shown by the arrow A in FIG. 2) will be referred to as a first detection state. Also, a state in which the exhaust gas is guided to the SOx concentration detection portion 20 through the oxidation catalyst 21B (i.e., a state in which the exhaust gas is guided in the direction shown by the arrow B in FIG. 2) will be referred to as a second detection state. In the SOx concentration detection portion 20, oxygen is used for detecting the concentration of SOx. Therefore, air (fresh air) containing oxygen required for causing the reaction may be supplied to the SOx concentration detection portions 20 so that the concentration of SOx can be reliably detected even during the sulfur poisoning recovery process during which the exhaust gas air-fuel ratio is controlled to be in a rich range. Further, the sulfur concentration sensor 10 may include temperature control means for maintaining the temperature thereof in a predetermined reaction range, such as a heater.

Figure 4:
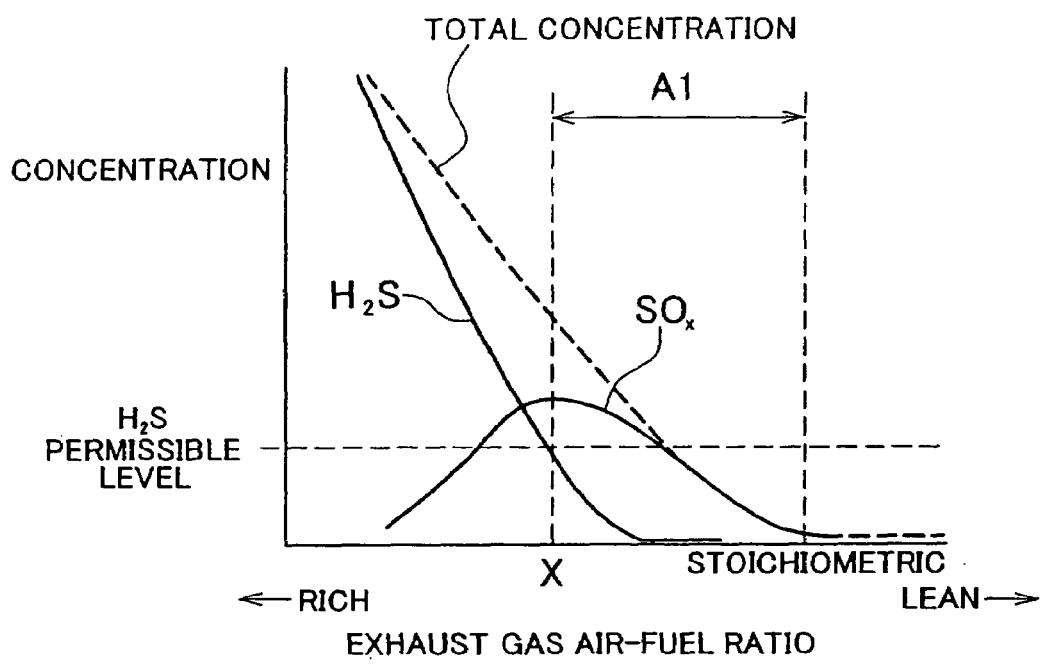
FIG. 4 is a graph showing an example of a corresponding relationship between a concentration of SOx and a total concentration that are detected by the sulfur concentration sensor and a concentration of $H_2S$ obtained based on these concentrations, and an exhaust gas air-fuel ratio.

Next, referring to FIG. 4, description will be made of an outline of a control of the exhaust gas air-fuel ratio, which is performed by the ECU 15 during the sulfur poisoning recovery process. FIG. 4 is a graph showing an example of a corresponding relationship between the concentration of SOx and the total concentration that are detected by the sulfur concentration sensor 10 during the sulfur poisoning recovery process and the concentration of $H_2S$ obtained based on these concentrations, and the exhaust gas air-fuel ratio. When the exhaust gas air-fuel ratio is changed from the stoichiometric air-fuel ratio to a rich air-fuel ratio, the concentration of SOx is increased immediately. However, after the concentration of SOx reaches a peak at an air-fuel ratio X, the concentration of SOx is reduced as the exhaust gas air-fuel ratio becomes richer (i.e., as the exhaust gas air-fuel ratio is further decreased). Meanwhile, as the exhaust gas air-fuel ratio becomes richer (i.e., as the exhaust gas air-fuel ratio is decreased from the stoichiometric air-fuel ratio), the total concentration is uniformly increased, as shown by a dashed line. The concentration of $H_2S$ is equivalent to a difference between these concentrations. The concentration of $H_2S$ is not detected when the exhaust gas air-fuel ratio is controlled to a value in the vicinity of the stoichiometric air-fuel ratio. The concentration of $H_2S$ starts to be detected at an air-fuel ratio in the vicinity of the air-fuel ratio X at which the concentration of SOx reaches the peak. Then, as the exhaust gas air-fuel ratio becomes richer (i.e., as the exhaust gas is further decreased), the concentration of $H_2S$ is gradually increased. The amount of SOx released from the NOx catalyst 8 is increased as the exhaust gas air-fuel ratio becomes richer. However, when the exhaust gas air-fuel ratio becomes richer than a certain level, the detected value of the concentration of SOx is reduced. Therefore, it becomes noticeable that SOx reacts with HC and CO, and $H_2S$ is generated. In this embodiment, a permissible level of the concentration of $H_2S$ is set in order to prevent occurrence of sulfur odor, or the like. The ECU 15 controls the operating state of the engine 1 such that the sulfur poisoning recovery process is performed in a range A1 of the exhaust gas air-fuel ratio in which the sulfur concentration sensor 10 detects SOx, and the concentration of $H_2S$ becomes equal to or lower than the permissible level. Due to this control, the sulfur poisoning recovery process can be caused to proceed reliably by releasing SOx from the NOx catalyst 8 while suppressing occurrence of sulfur odor caused by $H_2S$.

Figure 5:
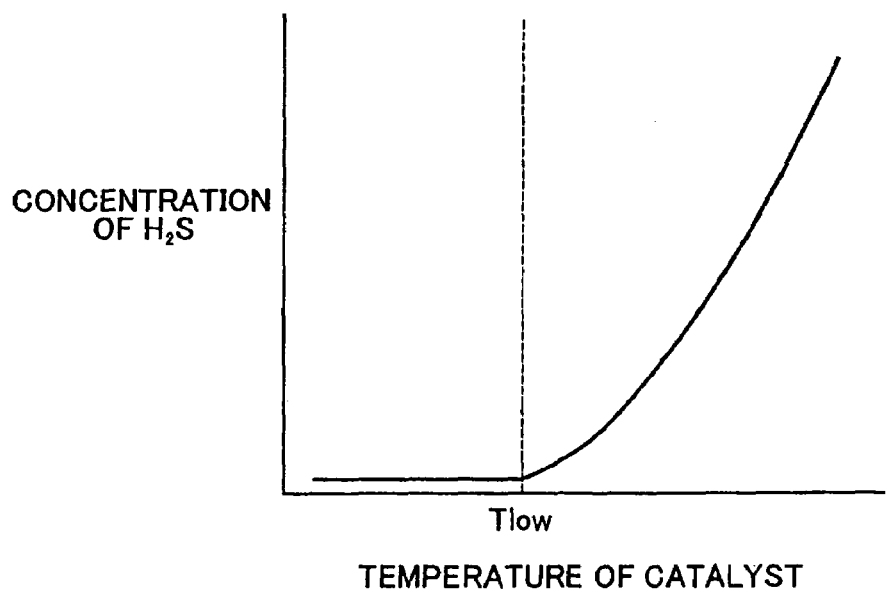
FIG. 5 is a graph showing an example of a corresponding relationship between a temperature of a NOx catalyst and the concentration of $H_2S$.

As shown in FIG. 5, the concentration of $H_2S$ generated during the sulfur poisoning recovery process is correlated with the temperature of the NOx catalyst 8. On the assumption that the exhaust gas air-fuel ratio is constant, when the temperature of the catalyst exceeds a lower limit temperature Tlow (for example, approximately 600° C.), $H_2S$ starts to be generated. Then, as the temperature of the catalyst is increased, the concentration of $H_2S$ is increased. Accordingly, the concentration of $H_2S$ can be reduced to be equal to or lower than the permissible level shown in FIG. 4 by controlling the temperature of the NOx catalyst 8. That is, in a case where the concentration of $H_2S$ is likely to exceed the permissible level during the sulfur poisoning recovery process, the concentration of $H_2S$ can be reduced to be equal to or lower than the permissible level by controlling the operating state of the engine 1 such that the temperature of the NOx catalyst 8 is relatively decreased in a SOx release temperature range. The ECU 15 can also perform this control.

Figure 6:
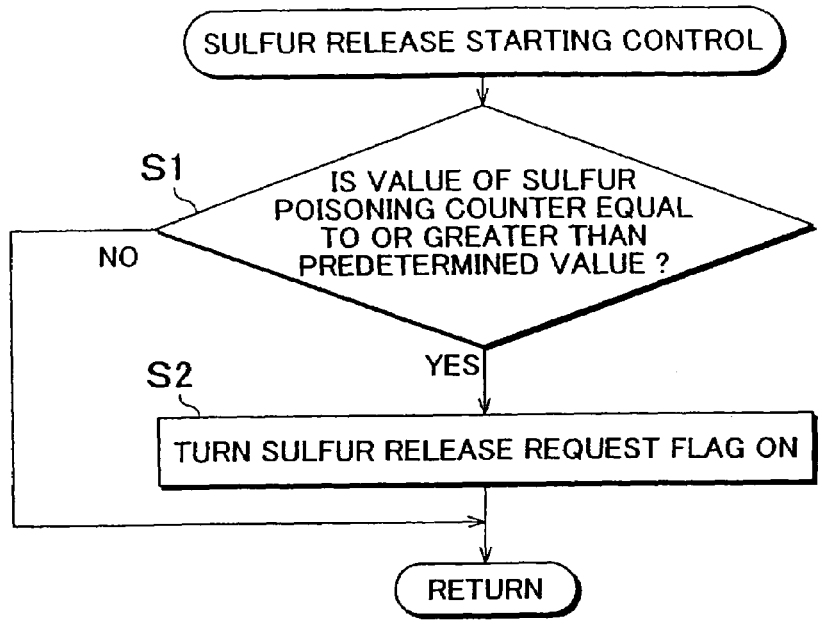
FIG. 6 is a flowchart showing a sulfur release starting control routine.

Next, referring to FIG. 6 to FIG. 10, description will be made of various control routines performed by the ECU 15 for the sulfur poisoning recovery process. FIG. 6 shows a sulfur release starting control routine for determining starting timing of the sulfur poisoning recovery process. The sulfur release starting control routine is performed by the ECU 15. This routine is repeatedly performed at appropriate time intervals while the engine 1 is operated. In the routine in FIG. 6, first, in step S1, the ECU 15 determines whether a value of a sulfur poisoning counter is equal to or greater than a predetermined value. The sulfur poisoning counter is provided for determining an amount of sulfur with which the NOx catalyst 8 is poisoned. The ECU 15 sequentially calculates the amount of SOx with which the NOx catalyst 8 is poisoned (hereinafter, referred to as "sulfur poisoning amount"), based on an amount of fuel injected from the fuel injection valve 16 and an estimated rate of the sulfur component contained in the fuel, by a separate routine. The sulfur poisoning counter accumulates the calculated values. The predetermined value used in step S1 is set as a threshold value for determining whether the SOx poisoning amount has increased to a level at which the sulfur poisoning recovery process needs to be performed. The amount of SOx in the exhaust gas may be detected using the SOx sensor disposed at a portion upstream of the NOx catalyst 8, and the sulfur poisoning amount in the NOx catalyst 8 may be determined by accumulating the detected amounts of SOx. In a case where a NOx sensor is provided at a portion downstream of the NOx catalyst 8, it may be determined that the sulfur poisoning recovery process needs to be performed by determining a degree of deterioration of the NOx catalyst 8 based on the concentration of NOx detected by the NOx sensor.

When the value of the sulfur poisoning counter is less than the predetermined value in step S1, the ECU 15 determines that SOx poisoning has not progressed to a level at which the sulfur poisoning recovery process needs to be performed, and ends the routine in FIG. 6. Meanwhile, when the value of the sulfur poisoning counter is equal to or greater than the predetermined value, the ECU 15 determines that the sulfur poisoning amount has reached a limit, and turns a sulfur release request flag on in step S2. Then, the ECU 15 ends the routine.

Figure 7:
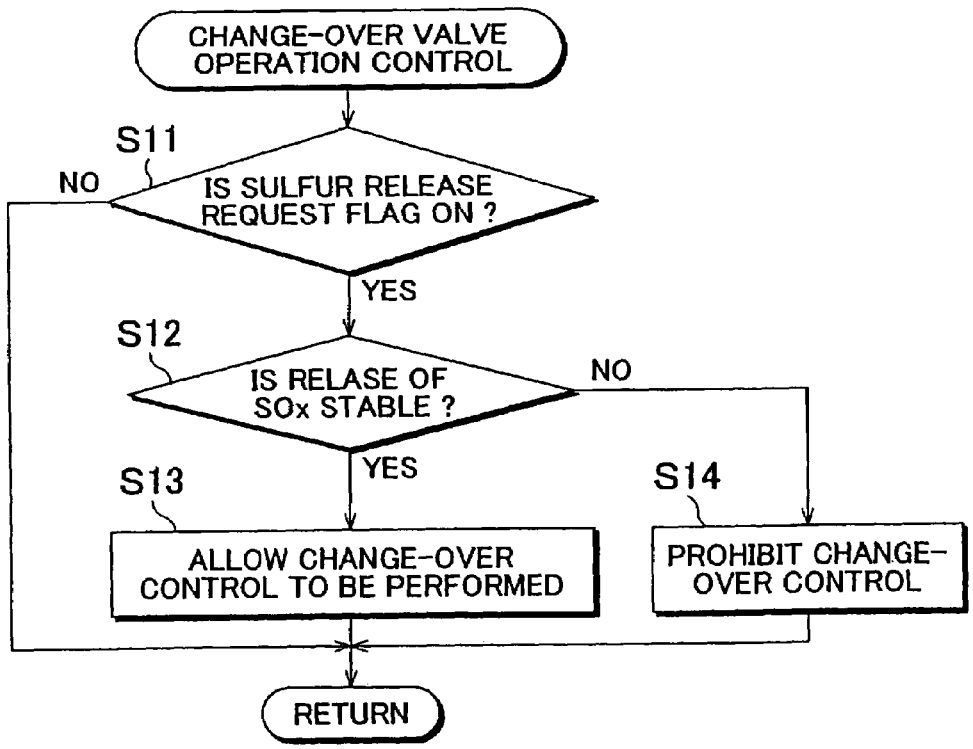
FIG. 7 is a flowchart showing a change-over valve operation control routine.

In order to accurately obtain the concentration of $H_2S$ during the sulfur poisoning recovery process, the ECU 15 repeatedly performs a change-over valve operation control routine in FIG. 7 at given time intervals. In the change-over valve operation control routine in FIG. 7, first, the ECU 15 determines whether the sulfur release request flag is on in step S11. When the sulfur release request flag is on, the ECU 15 performs step S12 and subsequent steps. When the sulfur release request flag is off, the ECU 15 skips step S12 and subsequent steps, and ends the present routine. In step S12, the ECU 15 determines whether SOx is being released from the NOx catalyst 8 stably. For example, the ECU 15 determines that SOx is not being released stably, for example, when the sulfur poisoning recovery process has just started, and release of SOx from the NOx catalyst 8 is not detected, or when the concentration of $H_2S$ is equal to or higher than the permissible level in FIG. 4. When it is determined that SOx is being released stably, the ECU 15 allows a change-over control to be performed in step S13. The change-over control changes the state of the change-over valve 22 such that the detection state of the sulfur concentration sensor 10 is alternately changed between the first detection state and the second detection state periodically at given time intervals. Subsequently, the ECU 15 ends the present control routine. The ECU 15 performs the change-over control for the change-over valve 22 by a separate routine. The concentration of $H_2S$ is obtained based on the total concentration and the concentration of SOx that are detected using the change-over control.

Figure 11:
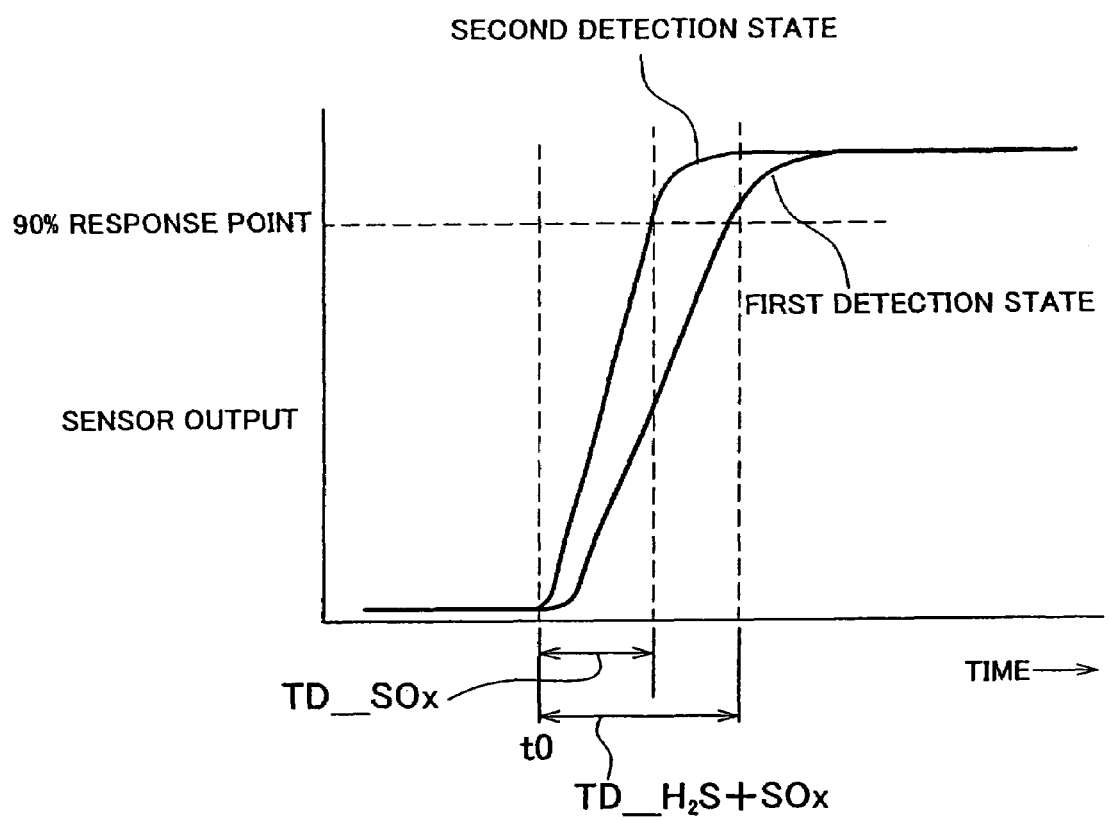
FIG. 11 is a graph showing response characteristics of the sulfur concentration sensor in a first detection state and in a second detection state.

A period from when the detection state of the sulfur concentration sensor 10 is changed to the first detection state using the change-over valve 22 until when the total concentration is detected (total concentration detection delay period) is set to be longer than a period from when the detection state of the sulfur concentration sensor 10 is changed to the second detection state using the change-over valve 22 until when the concentration of SOx is detected (SOx concentration detection delay period). In the sulfur concentration sensor 10, it takes a longer time to complete the oxidation reaction, particularly the oxidation reaction of $H_2S$ in the oxidation catalyst 21A in the first detection state, than to complete the oxidation reaction in the oxidation catalyst 21B in the second detection state. In addition, since only SOx is oxidized in the catalyst 21B, but both of SOx and $H_2S$ need to be oxidized in the catalyst 21A, it takes a longer time to complete the oxidation reaction in the catalyst 21A. Further, in the case where the capacity of the catalyst 21A is set to be larger than the capacity of the catalyst 21B, it takes a longer time for the exhaust gas to pass through the catalyst 21A, than for the exhaust gas to pass through the catalyst 21B, since the catalyst 21A has larger capacity than the capacity of the catalyst 21B. For example, as shown in FIG. 11, as compared to a response delay period in a case where the detection state of the sulfur concentration sensor 10 is changed to the second detection state, for example, a period TD_SOx from time t0 at which detection is started until a 90% response point is reached, a response delay period TD_$H_2S$+SOx in a case where the detection state of the sulfur concentration sensor 10 is changed to the first detection state may be increased according to a difference between the time required for completing the oxidation reaction in the first detection state and the time required for completing the oxidation reaction in the second detection state. Accordingly, the total concentration detection delay period is set to be longer than the SOx concentration detection delay period, whereby accuracy of detecting the total concentration and the concentration of SOx is improved. Thus, the concentration of $H_2S$ can be accurately obtained.

The control routine in FIG. 7 will be described again. When it is determined that release of SOx is not stable, the ECU 15 prohibits the change-over control for the change-over valve 22 in step S14. Then, the present control routine is ended. When release of SOx is not stable, the detected values of the total concentration and the SOx concentration are not stable. In such a case, the change-over control is prohibited. The ECU 15 changes the detection state of sulfur concentration sensor 10 to the first detection state or the second detection state according to a state of the NOx catalyst 8 using the change-over valve 22, and then prohibits the change-over control. For example, when the sulfur poisoning recovery process has just started, and release of SOx is not detected, the ECU 15 changes the detection state of the sulfur concentration sensor 10 to the second detection state using the change-over valve 22, and then prohibits the change-over control. As shown in FIG. 4, when the sulfur recovery process is performed, SOx is released from the NOx catalyst 8 earlier than $H_2S$. Accordingly, the detection state of the sulfur concentration sensor 10 is changed to the second detection state using the change-over valve 22, and then the sulfur concentration sensor 10 is caused to remain in the second detection state by causing the change-over valve 22 to remain in the same state. Thus, accuracy of detecting the concentration of SOx is improved. Also, when the concentration of $H_2S$ is equal to or higher than the predetermined value (permissible level), the ECU 15 changes the detection state of the sulfur concentration sensor 10 to the first detection state using the change-over valve 22, and then prohibits the change-over control. Since the sulfur concentration sensor 10 is caused to remain in the first detection state by causing the change-over valve 22 in the same state, a change in the concentration of $H_2S$ can be accurately obtained.

By controlling the operation of the change-over valve 22 in this manner, it is possible to accurately obtain the concentration of $H_2S$ during the sulfur poisoning recovery process. In a case where the detection state of the sulfur concentration sensor 10 is changed from the second detection state to the first detection state, only when a range of variation of the concentration of SOx detected in the second detection state is equal to or less than a predetermined value, the ECU 15 changes the detection state of the sulfur concentration sensor 10 to the first detection state. Thus, since the detection state of the sulfur concentration sensor 10 is changed only when the range of variation of the concentration of SOx is equal to or less than the predetermined value, accuracy of detecting the concentration of SOx can be improved.

Figure 8:
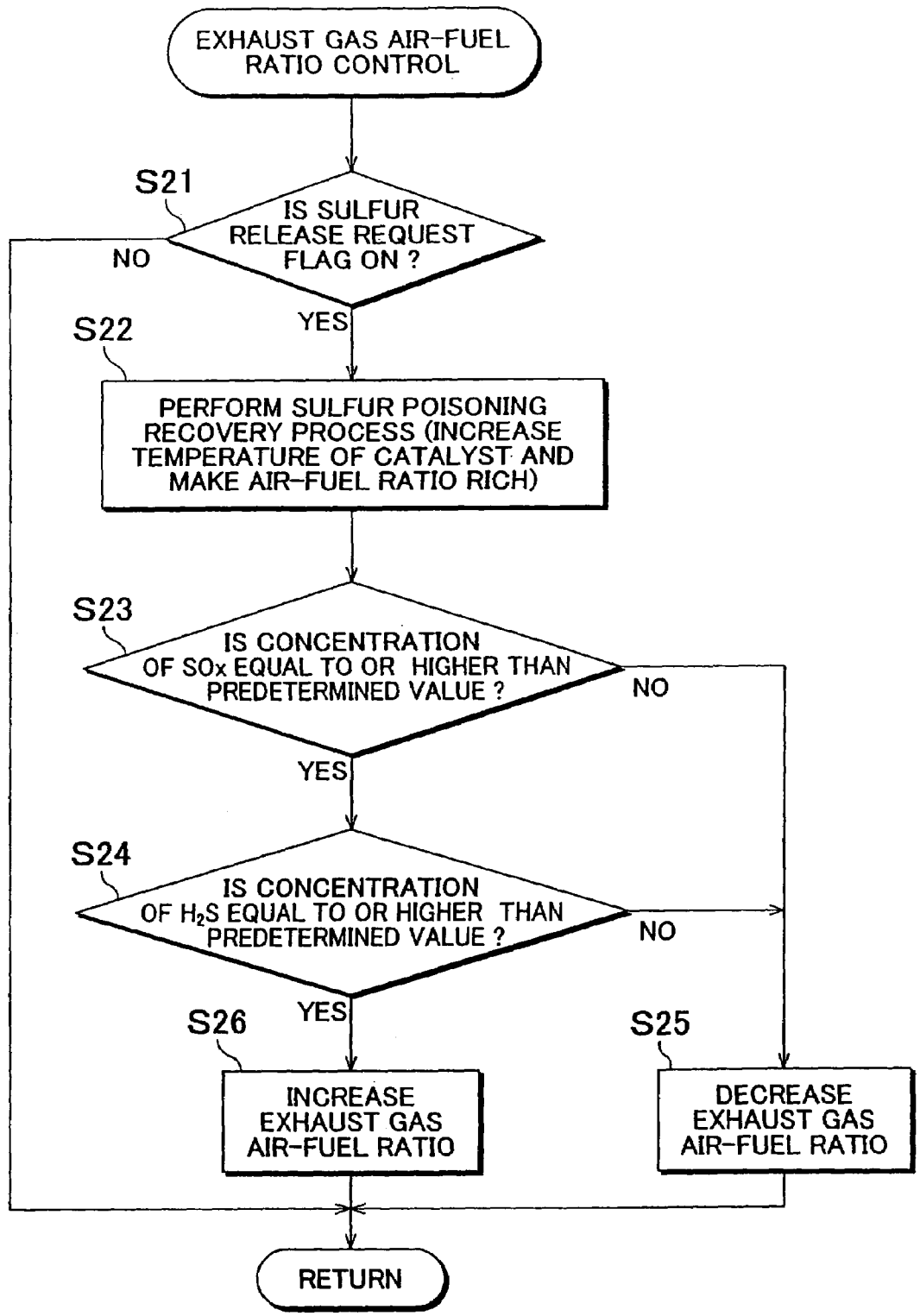
FIG. 8 is a flowchart showing an exhaust gas air-fuel ratio control routine.
Figure 9:
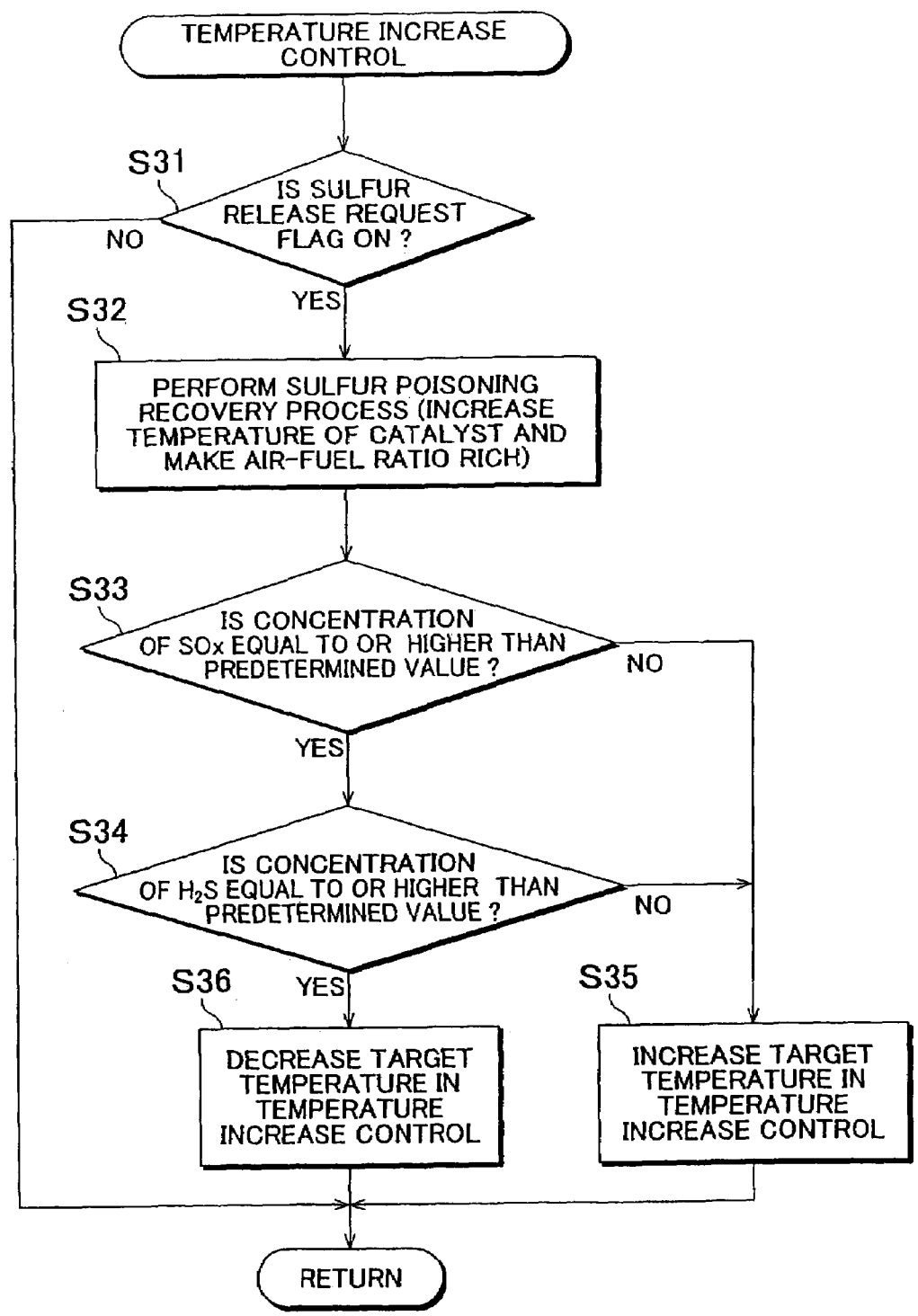
FIG. 9 is a flowchart showing a temperature increase control routine.

When the sulfur release request flag is turned on, in order to perform the sulfur poisoning recovery process, the ECU 15 repeatedly performs an exhaust gas air-fuel ratio control routine in FIG. 8 and a temperature increase control routine in FIG. 9 at given time intervals. In the exhaust gas air-fuel ratio control routine in FIG. 8, first, the ECU 15 determines whether the sulfur release request flag is on in step S21. When the sulfur release request flag is on, the ECU 15 performs step S22 and subsequent steps. When the sulfur release request flag is off, the ECU 15 skips step S22 and subsequent steps, and ends the present routine. In step S22, the operating state of the engine 1 is controlled such that the exhaust gas air-fuel ratio is maintained in a rich range (i.e., a range in which the fuel amount is larger than the fuel amount at the stoichiometric air-fuel ratio), and the temperature of the NOx catalyst 8 is increased to the SOx release temperature range, whereby the sulfur poisoning recovery process is performed. In a case where the sulfur poisoning recovery process is being started, the sulfur poisoning recovery process continues to be performed. The exhaust gas air-fuel ratio is made rich, and the temperature of the NOx catalyst 8 is increased, for example, by additionally injecting fuel from the fuel injection valve 16 after performing main fuel injection for combustion in the cylinder 2, that is, by performing so-called post-injection. In a case where a fuel supply valve is provided at a portion upstream of the NOx catalyst 8 in the exhaust passage 4, the exhaust gas air-fuel ratio may be controlled to be in the rich range by supplying fuel from the fuel supply valve. The control of the operating state of the engine 1 is not limited to the control of combustion in the cylinder 2, but includes the aforementioned control in the exhaust passage 4.

After the sulfur-poisoning recovery process is started in step S22, it is determined whether the concentration of SOx detected by the sulfur concentration sensor 10 is equal to or higher than a predetermined value in step S23. The predetermined value is set to a lowest SOx release level, which is the lowest level required for completing recovery of the NOx catalyst from sulfur poisoning by the sulfur poisoning recovery process in an appropriate period. When the concentration of SOx is lower than the predetermined value, the exhaust gas air-fuel ratio is decreased by a predetermined step amount in step S25. That is, the exhaust gas air-fuel ratio is changed to an air-fuel ratio at which the air amount is small as compared to the air amount at an air-fuel ratio before step S25 is performed. This change in the exhaust gas-air fuel ratio does not signify the change from the stoichiometric air-fuel ratio to a rich air-fuel ratio. The exhaust gas air-fuel ratio is decreased, for example, by operating the throttle valve 7 and the EGR valve 13 so that an amount of intake air (strictly speaking, an amount of oxygen) is decreased. Also, the exhaust gas air-fuel ratio may be decreased by increasing the amount of fuel supplied by the post injection.

When the concentration of SOx is equal to or higher than the predetermined value in step S23, it is determined whether the concentration of $H_2S$ obtained by the change-over control is equal to or higher than a predetermined value in step S24. The predetermined value is set to the permissible level in FIG. 4. However, in order to prevent the concentration of $H_2S$ from temporarily becoming higher than the permissible level due to delay in response of the control, the predetermined value in step S24 may be set to be lower than the permissible level. When the concentration of $H_2S$ is lower than the predetermined value, the exhaust gas air-fuel ratio is decreased in step S25. Meanwhile, when the concentration of $H_2S$ is equal to or higher than the predetermined value, the exhaust gas air-fuel ratio is increased by a predetermined step amount in step S26. That is, the exhaust gas air-fuel ratio is changed to an air-fuel ratio at which the air amount is large as compared to the air amount at an air-fuel ratio before step 26 is performed. This change in the exhaust gas-air fuel ratio does not signify the change from the stoichiometric air-fuel ratio to a lean air-fuel ratio. The exhaust gas air-fuel ratio is increased, for example, by operating the throttle valve 7 and the EGR valve 13 so that the amount of intake air is increased. Also, the exhaust gas air-fuel ratio may be increased by decreasing the amount of fuel supplied by the post injection. These operations can be regarded as one of the controls of the operations state of the internal combustion engine. In a case where an air injection device for introducing air to the exhaust passage 4 is provided, for example, in order to promote warming-up of the NOx catalyst 8, the exhaust gas air-fuel ratio may be increased by introducing air into the exhaust passage 4 from the air injection device. After the exhaust gas air-fuel ratio is changed in step S25 or step S26, the present routine is ended.

Meanwhile, in the temperature increase control routine in FIG. 9, first, the ECU 15 determines whether the sulfur release request flag is on in step S31. When the sulfur release request flag is on, the ECU 15 performs step S32 and subsequent steps. When the sulfur release request flag is off, the ECU 15 skips step S32 and subsequent steps, and ends the present routine. In step S32, the operating state of the engine 1 is controlled such that the exhaust gas air-fuel ratio is maintained in the rich range, and the temperature of the NOx catalyst 8 is increased to the SOx release temperature range, whereby the sulfur poisoning recovery process is performed. The processes in step S31 and step S32 are the same as those in step S21 and step S22 in FIG. 8. In step S33, it is determined whether the concentration of SOx is equal to or higher than the predetermiined value as in step S23 in FIG. 8. In step S34, it is determined whether the concentration of $H_2S$ is equal to or higher than the predetermined value as in step S24 in FIG. 8. The predetermined values used in step S33 and S34 are the same as the predetermined values used in step S23 and S24, respectively. When the concentration of SOx is lower than the predetermined value, or when the concentration of $H_2S$ is lower than the predetermined value, a target temperature in the temperature increase control for the NOx catalyst 8 is increased by a predetermined step amount in step S35. When the concentration of SOx is equal to or higher than the predetermined value and the concentration of $H_2S$ is equal to or higher than the predetermined value, the target temperature in the temperature increase control is decreased by a predetermined step amount. The ECU 15 controls the operating state of the engine 1 such that the temperature of the NOx catalyst 8 becomes equal to the target temperature in the SOx release temperature range by a separate routine during the sulfur poisoning recovery process. In the processes in step S35 and S36, the temperature of the NOx catalyst 8 is changed by changing the target temperature.

The temperature of the NOx catalyst 8 is adjusted, for example, by increasing or decreasing the amount of fuel supplied by the post injection. Naturally, as the amount of fuel is increased, the temperature of the catalyst is increased. Also, the temperature of the catalyst can be decreased by decreasing the amount of fuel supplied by the post injection. However, since the temperature of the NOx catalyst 8 is correlated with the temperature of the exhaust gas, for example, the temperature of the catalyst can be adjusted also by changing timing of the main injection for combustion in the cylinder 2 so as to change the temperature of the exhaust gas. In this case, when the fuel injection timing is retarded, the temperature of the catalyst is increased. When the retarded fuel injection timing is advanced to the original fuel injection timing, the temperature of the catalyst is decreased. After the target temperature of the catalyst is changed in step S35 or step S36, the present temperature increase control routine is ended.

Figure 10:
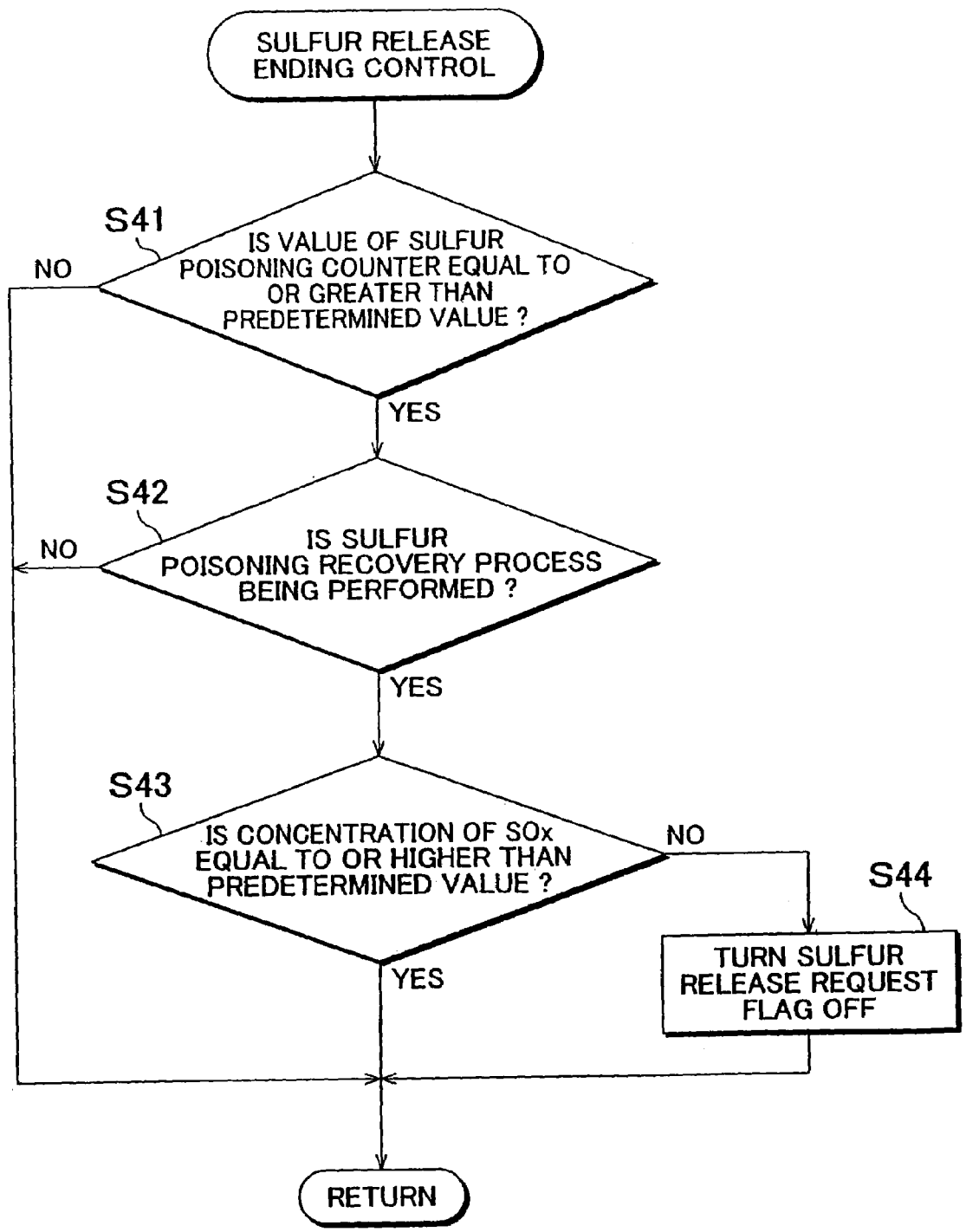
FIG. 10 is a flowchart showing a sulfur release ending control routine.

FIG. 10 shows a sulfur release ending control routine for determining ending timing of the sulfur poisoning recovery process. The sulfur release ending control routine is performed by the ECU 15. The routine is repeatedly performed at appropriate time intervals while the engine 1 is operated. In the routine in FIG. 10, first, the ECU 15 determines whether the value of the sulfur poisoning counter is equal to or greater than the predetermined value in step S41. The predetermined value used in step S41 is the same as the predetermined value used in step S1 in FIG. 6. When the value of the sulfur poisoning counter is equal to or greater than the predetermined value, the ECU 15 performs step S42 and subsequent steps. When the value of the sulfur poisoning counter is less than the predetermined value, the ECU 15 skips step S42 and subsequent steps, and ends the present routine. In step S42, it is determined whether the sulfur poisoning recovery process is being performed. When the sulfur poisoning recovery process is being performed, the ECU 15 performs step S43. When the sulfur poisoning recovery process is not being performed, the ECU 15 skips step S43 and subsequent steps, and ends the present routine.

In step S43, it is determined whether the concentration of SOx detected by the sulfur concentration sensor 10 is equal to or higher than a predetermined value. The predetermined value used in step S43 is set as a threshold value for determining whether the sulfur poisoning recovery process should be ended. The predetermined value used in step S43 is set to be smaller than the predetermined value used in step S23 in FIG. 8, and the predetermined value used in step S33 in FIG. 9 so that the sulfur poisoning recovery process is not ended even when SOx is released at the lowest level required for causing the sulfur poisoning recovery process to proceed. When it is determined that the concentration of SOx is lower than the predetermined value in step S43, the sulfur release request flag is turned off in step S44, and the present routine is ended. When it is determined that the concentration of SOx is equal to or higher than the predetermined value in step S43, step S44 is skipped, and the routine is ended.

Since the control that has been described is performed, when the amount of released SOx during the sulfur poisoning recovery process has decreased to the lowest level required for the sulfur poisoning recovery process, the exhaust gas air-fuel ratio is decreased by the processes in step S23 and step S25 in FIG. 8, and the temperature of the catalyst is increased in the processes in step S33 and step S35 in FIG. 9. Accordingly, SOx is released from the NOx catalyst 8 at the lowest required level during the sulfur poisoning recovery process, and thus the sulfur poisoning recovery process reliably proceeds. Also, when the concentration of $H_2S$ is equal to or lower than the permissible level, the processes in step S24 and step S25 in FIG. 8 are repeatedly performed, whereby the exhaust gas air-fuel ratio is gradually decreased. In addition, the processes in step S34 and step S35 in FIG. 9 are repeatedly performed, whereby the temperature of the catalyst is gradually increased. Meanwhile, when the concentration of $H_2S$ has increased to the permissible level (permissible limit), the processes in step S24 and step S26 in FIG. 8 are performed, whereby the exhaust gas air-fuel ratio is increased to some degree. In addition, the processes in step S34 and step S36 in FIG. 9 are performed, whereby the temperature of the catalyst is decreased to some degree. Thus, the sulfur poisoning recovery process can be caused to proceed efficiently by promoting release of SOx from the NOx catalyst 8 as much as possible while the concentration of $H_2S$ is controlled to be equal to or lower than the permissible level.

In the aforementioned embodiment, the ECU 15 constitutes a controller which performs the poisoning recovery process for the NOx catalyst 8, and the change-over control for the change-over valve 22.

The invention is not limited to the aforementioned embodiment. The invention can be realized in various embodiments. For example, in order to control the concentration of SOx and the concentration of $H_2S$ to values in the range A1 in FIG. 4 during the sulfur poisoning recovery process, only one of the controls in FIG. 8 and FIG. 9 may be performed. In step S24 in FIG. 8 and in step S34 in FIG. 9, when the concentration of $H_2S$ is lower than the predetermined value, the routine may be ended without performing step S25 or step S35.

The determination as to the ending timing of the sulfur poisoning recovery process is not limited to the determination as shown in FIG. 10. In step S43 in FIG. 10, it is determined that the sulfur poisoning recovery process should be ended based on the concentration of SOx. However, for example, it may be determined that the sulfur poisoning recovery process should be ended when the total concentration detected by the sulfur concentration sensor 10 which is in the first detection state has decreased to be lower than a predetermined value. Also, the ECU 15 may repeatedly calculate the amount of SOx released from the NOx catalyst 8 based on the detected value of the concentration of SOx or the total concentration, and may accumulate the calculated values to obtain an accumulated value from when the sulfur poisoning recovery process is started, and may determine that the sulfur poisoning recovery process should be ended when a difference between the accumulated value and the value of the sulfur poisoning counter becomes less than a predetermined value. Further, the invention is not limited to a diesel engine. The invention can be applied to various internal combustion engines using gasoline and other fuels.

The invention claimed is:

1. An exhaust gas control apparatus for an internal combustion engine, comprising:
   a NOx storage reduction catalyst which is provided in an exhaust passage for an internal combustion engine;
   a concentration detector whose detection state can be changed between a first detection state in which a total concentration of sulfur oxide and hydrogen sulfide in exhaust gas that has passed through the NOx storage reduction catalyst is detected, and a second detection state in which a concentration of the sulfur oxide in the exhaust gas is detected; and
   a controller which performs a poisoning recovery process that controls an operating state of the internal combustion engine such that the sulfur oxide is released from the NOx storage reduction catalyst, wherein
   the detection state of the concentration detector is alternately changed between the first detection state and the second detection state after the concentration dectector which is in the second detection state detects release of the sulfur oxide from the NOx storage reduction catalyst during the poisoning recovery process performed by the controller, whereby the concentration detector obtains the concentration of the sulfur oxide and a concentration of the hydrogen sulfide.

2. The apparatus according to claim 1, wherein the detection state of the concentration detector is changed between the first detection state and the second detection state at given time intervals.

3. The apparatus according to claim 1, wherein the detection state of the concentration detector is changed to the first detection state when it is determined that a range of variation of the concentration of the sulfur oxide that is detected by the concentration detector is equal to or less than a predetermined value.

4. The apparatus according to claim 1, wherein the concentration detector includes an oxidation catalyst that has oxidation catalytic activity for the hydrogen sulfide; the concentration detector which is in the first detection state detects the total concentration of the sulfur oxide and the hydrogen sulfide in exhaust gas that has passed through the oxidation catalyst; and a delay period from when the detection state of the concentration detector is changed to the first detection state until when the total concentration is detected is set to be longer than a delay period from when the detection state of the concentration detector is changed to the second detection state until when the concentration of the sulfur oxide is detected.

5. The apparatus according to claim 1, wherein the controller changes the detection state of the concentration detector to the first detection state or the second detection state according to a state of the NOx storage reduction catalyst during the poisoning recovery process performed by the controller.

6. The apparatus according to claim 1, wherein when the controller determines that the concentration of the hydrogen sulfide that is obtained by the concentration detector during the poisoning recovery process exceeds a permissible limit, the controller causes the concentration detector to remain in the first detection state, the controller controls the operating state of the internal combustion engine such that the sulfur oxide is released from the NOx storage reduction catalyst, an amount of the released sulfur oxide is in a predetermined range, and the concentration of the hydrogen sulfide is reduced, and the controller changes the detection state of the concentration detector to the second detection state after the total concentration starts to decrease.

7. The apparatus according to claim 6, wherein the controller controls the operating state of the internal combustion engine such that the concentration of the hydrogen sulfide is reduced, by performing at least one of a process of increasing an exhaust gas air-fuel ratio in a rich air-fuel ratio range, and a process of decreasing a temperature of the NOx storage reduction catalyst in a temperature range in which the sulfur oxide is released.

8. The apparatus according to claim 1, wherein when the controller determines that the concentration of the hydrogen sulfide is lower than a permissible limit, the controller controls the operating state of the internal combustion engine such that the amount of the sulfur oxide released from the NOx storage reduction catalyst is increased.

9. The apparatus according to claim 8, wherein the controller controls the operating state of the internal combustion engine such that the amount of the released sulfur oxide is increased, by performing at least one of a process of decreasing an exhaust gas air-fuel ratio, and a process of increasing a temperature of the NOx storage reduction catalyst.

10. An exhaust gas control method for an internal combustion engine, comprising the steps of:
    performing a poisoning recovery process that controls an operating state of an internal combustion engine such that sulfur oxide is released from a NOx storage; reduction catalyst provided in an exhaust passage for the internal combustion engine;
    detecting a concentration of the sulfur oxide in an exhaust gas that has passed through the NOx storage reduction catalyst by a concentration detector which is in a second detection state during the poisoning recovery process;
    changing a detection state of the concentration detector between a first detection state in which a total concentration of sulfur oxide and hydrogen sulfide in the exhaust gas and the second detection state after the concentration of the sulfur oxide is detected by the concentration detector which is in the second detection state, and obtaining the concentration of sulfur oxide and a concentration of hydrogen sulfide.

* * * * *